United States Patent
Yakushiji et al.

(10) Patent No.: US 7,443,564 B2
(45) Date of Patent: Oct. 28, 2008

(54) PARTICLES FOR DISPLAY MEDIA AND INFORMATION DISPLAY PANEL USING THE PARTICLES

(75) Inventors: Gaku Yakushiji, Higashiyamato (JP); Yoneji Kobayashi, Isezaki (JP); Kazuya Murata, Hino (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/790,980

(22) Filed: Apr. 30, 2007

(65) Prior Publication Data

US 2007/0281159 A1    Dec. 6, 2007

(30) Foreign Application Priority Data

May 10, 2006  (JP)  .............................. 2006-131377
Apr. 24, 2007  (JP)  .............................. 2007-113734

(51) Int. Cl.
  *G02F 1/03*   (2006.01)
  *G02B 26/00*  (2006.01)

(52) U.S. Cl. ...................................... 359/245; 359/296

(58) Field of Classification Search ................ 359/245, 359/296

See application file for complete search history.

(56) References Cited

U.S. PATENT DOCUMENTS 5,665,508 A * 9/1997 Inagaki et al. ............ 430/111.3

2007/0171511 A1 * 7/2007 Kobayashi et al. ........... 359/296

FOREIGN PATENT DOCUMENTS

EP  1 429 178 A1   6/2004
EP  1 710 618 A1  10/2006

OTHER PUBLICATIONS

European Search Report dated Aug. 7, 2007/.
"Zeonex. Basis Properties", Internet Citation, [Online] Aug. 20, 2003, XP002309554, Retrieved from the Internet: URL:http://web.archive.org/web20030820181254/http://www.zeon.co.jp/business_e/enterprise/speplast/speplast_8.html> [retrieved on Dec. 7, 2004].

* cited by examiner

*Primary Examiner*—Jordan M. Schwartz
*Assistant Examiner*—James C Jones
(74) *Attorney, Agent, or Firm*—Sughrue Mion, PLLC

(57) ABSTRACT

In the particles for display media constituting the display media used for an information display panel, in which the display media are sealed between two substrates, at least one substrate being transparent, and, in which the display media, to which an electrostatic field is applied, are made to move so as to display information such as an image, the particles for display media, which are produced by crushing resin blocks and classifying them, are that Izot impact strength of the resin constituting the particles for display media (based on ASTM D256) is less than 4 kgf·cm/cm and a deflection temperature under load of the resin constituting the particles for display media (base on ASTM D648) exceeds 100° C.

6 Claims, 5 Drawing Sheets (a)

(b)

PARTICLES FOR DISPLAY MEDIA AND INFORMATION DISPLAY PANEL USING THE PARTICLES

BACKGROUND OF THE INVENTION

1. Field of the Invention

The present invention relates to the particles for display media and the information display panel using the above particles, in which the display media are sealed between two substrates, at least one substrate being transparent, and, in which the display media, to which an electrostatic field is applied, are made to move so as to display information such as an image.

2. Description of Related Art

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable, as compared with LCD, as inexpensive visual display device of the next generation from a merit having wide field of vision close to normal printed matter, having smaller consumption, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability during display rewriting.

As one method for overcoming the various problems mentioned above, an information display panel is known, in which the display media are sealed between two substrates, at least one substrate being transparent, and, in which the display media, to which an electrostatic field is applied, are made to move so as to display information such as an image. In the information display panel, in which the display media are moved by an electrostatic field so as to display information such as an image, as for the particles constituting the display media, the inventors develop particles for display media utilizing styrene resin as particle raw materials, and the particles for display media mentioned above are used for the image display panel mentioned above.

In the particles for display media utilizing the styrene resin for the particle raw materials as mentioned above, since a glass transition temperature Tg of the resin constituting the particles for display media is about 90° C. and thus a heat resistance is low, it is difficult to use them under a high temperature. Therefore, it is necessary that the resin constituting the particles for display media has a high heat resistance. Moreover, since the particles for display media constituting the display media are generally formed by kneading the raw materials and crushing them, it is necessary that the resin constituting particles for display media has a thermoplasticity. Further, in the case such that the resin that is difficult to crush is used as the resin constituting the particles for display media, since a pressure during the crushing operation becomes high and an amount of a pigment in the particles is decreased due to a dropout of titanium oxide and so on used as the pigment, a degree of whiteness is deteriorated especially in the case of using white pigments. Therefore, it is necessary that the resin constituting the particles for white color display media is easy to crush (that is, the resin has a low impact strength).

According to the requirements mentioned above, whether or not general thermoplastic resins (acrylic resin, styrene resin, polycarbonate rein, polypropylene resin, polyethylene terephthalate resin) are used as the resin constituting the particles for display media is investigated. As a result, it is understood that the resin having a high heat resistance is difficult to crush since it has a high strength, and the resin having a low impact strength has a low glass transition temperature Tg and a low heat resistance. Therefore, it is difficult to find the resin that satisfied all the requirements mentioned above. However, the inventors are confirmed that, in the case of using cycloolefin resin, there are cases that satisfy all the requirements mentioned above.

SUMMARY OF THE INVENTION

The present invention has for its first object to provide particles for display media, which have a high heat resistance and maintain an amount of a pigment, by using, as the particles for display media, a thermoplastic resin in which Izot impact strength is less than a predetermined strength value and a deflection temperature under load is not less than a predetermined temperature value.

The present invention has for its second object to provide an information display panel constructed by using the particles for display media mentioned above, which has excellent endurance and display quality.

In order to achieve the first object, according to the invention, particles for display media constituting the display media used for an information display panel, in which the display media are sealed between two substrates, at least one substrate being transparent, and, in which the display media, to which an electrostatic field is applied, are made to move so as to display information such as an image, comprises the particles for display media, which are produced by crushing resin blocks and classifying them, wherein Izot impact strength of the resin constituting the particles for display media (based on ASTM D256) is less than 4 kgf·cm/cm and a deflection temperature under load of the resin constituting the particles for display media (base on ASTM D648) exceeds 100° C.

As a preferred embodiment of the particles for display media according to the invention, there are cases: such that a material of the resin is cycloolefin resin; such that an average particle diameter is 0.1-50 μm; such that a charge amount of the particles for display media measured by a blow-off method utilizing carriers is 10-100 μC/g in an absolute value; and such that the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge.

In order to achieve the second object, according to the invention, an information display panel comprises a construction: such that at least one or more groups of display media including the particles for display media mentioned above are sealed between two opposed substrates, at least one substrate being transparent; and such that the display media, to which an electrostatic field generated between the substrates is applied, are made to move so as to display information such as an image.

In the particles for display media according to the invention mentioned above, since particles for display media constituting the display media used for an information display panel, in which the display media having optical reflectance and charge characteristics are sealed between two substrates, at least one substrate being transparent, and, in which the display media, to which an electrostatic field is applied, are made to move so as to display information such as an image, comprises the particles for display media, which are produced by crushing resin blocks and classifying them, wherein Izot impact strength of the resin constituting the particles for display media (based on ASTM D256) is less than 4 kgf·cm/cm and a deflection temperature under load of the resin constituting the particles for display media (base on ASTM D648) exceeds 100° C., the particles for display media uses the resin having a high heat resistance that is easily crushable, and thus the particles for display media have a high heat resistance and maintain an amount of the pigment as demonstrated by the following examples.

In the information display panel according to the invention mentioned above, since an information display panel comprises a construction: such that at least one or more groups of display media including the particles for display media mentioned above are sealed between two opposed substrates, at least one substrate being transparent; and such that the display media, to which an electrostatic field generated between the substrates is applied, are made to move so as to display information such as an image, the information display panel has excellent endurance and display quality as demonstrated by the following examples.

DESCRIPTION OF THE PREFERRED EMBODIMENT

Figure 1:
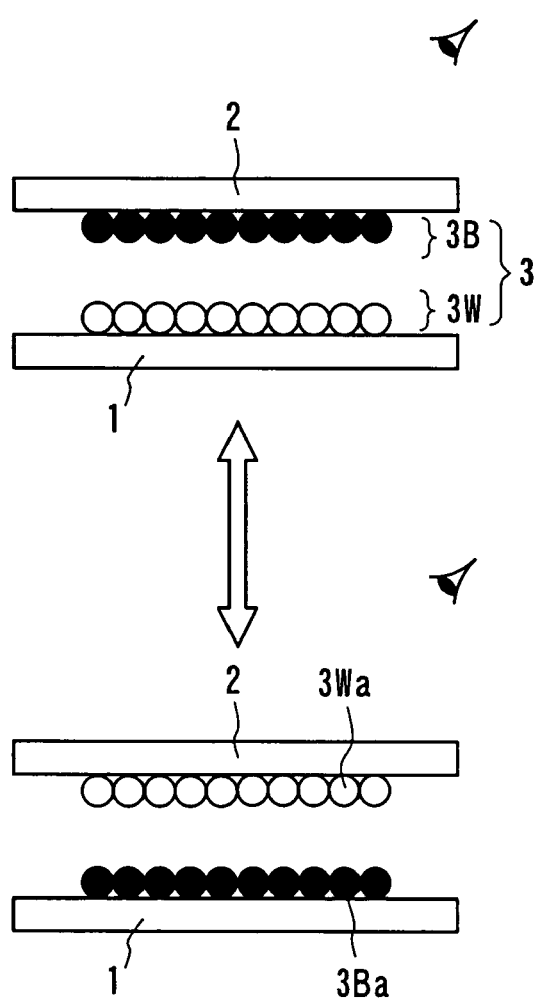
FIGS. 1a and 1b are schematic views respectively showing one embodiment of the information display panel according to the invention.
Figure 1:
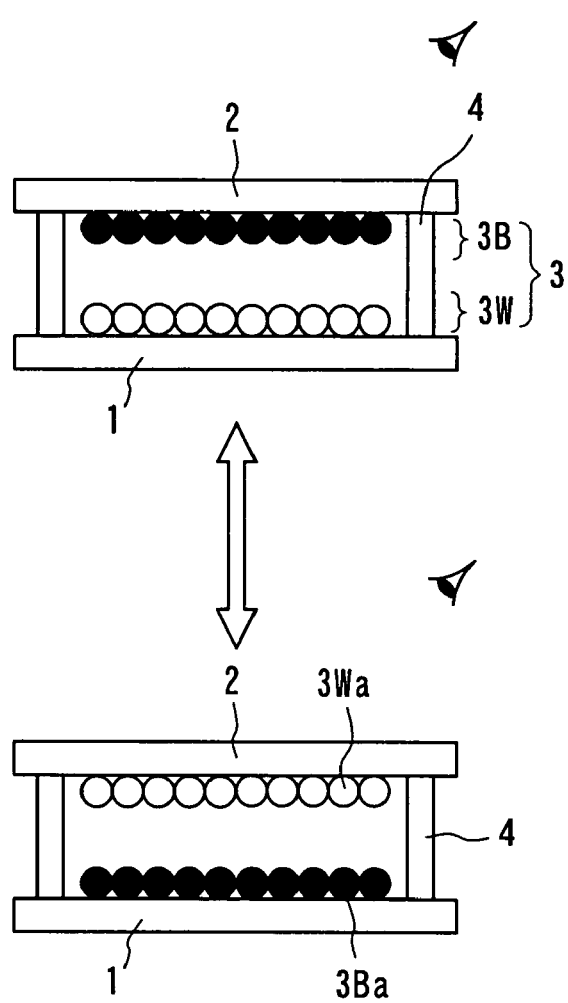
Figure 2:
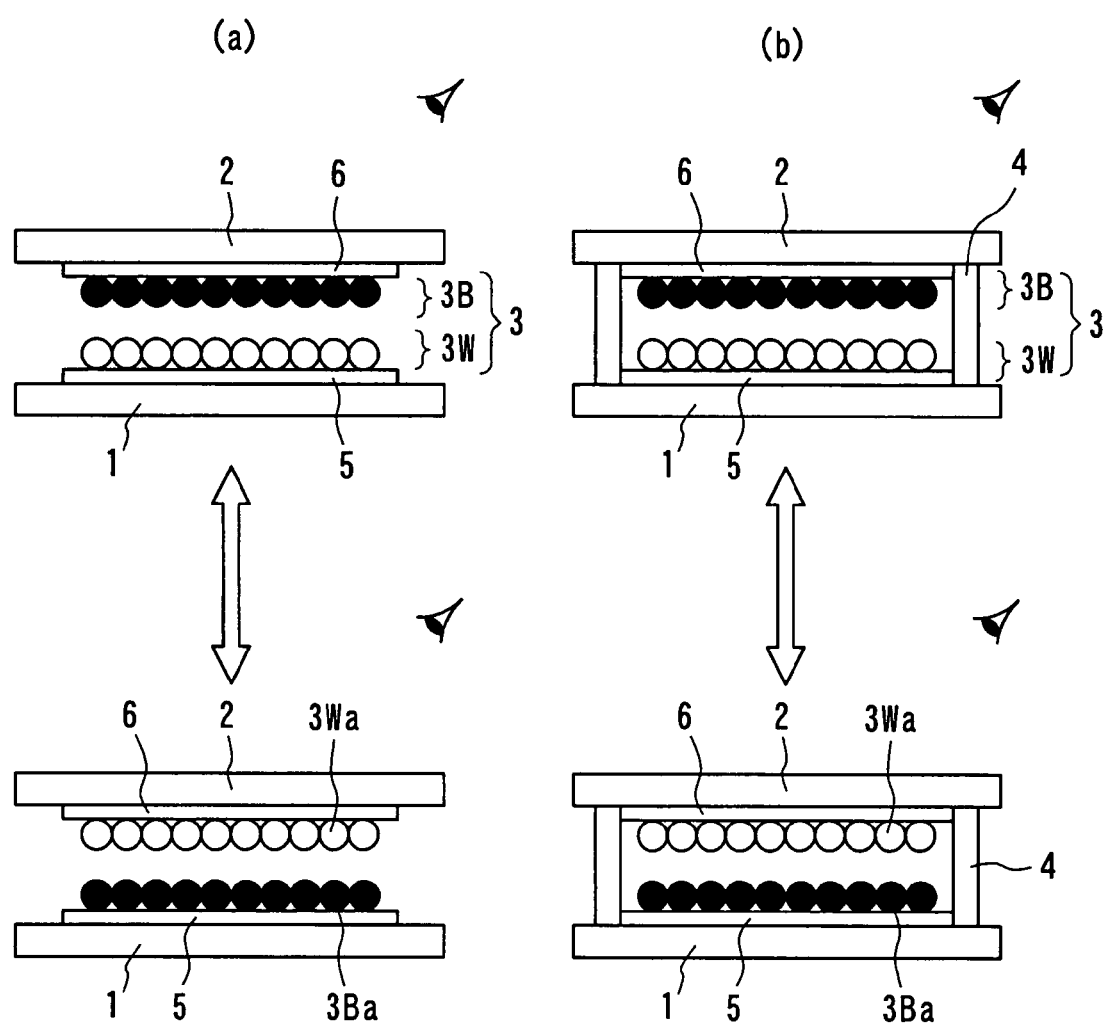
FIGS. 2a and 2b are schematic views respectively illustrating another embodiment of the information display panel according to the invention.
Figure 3:
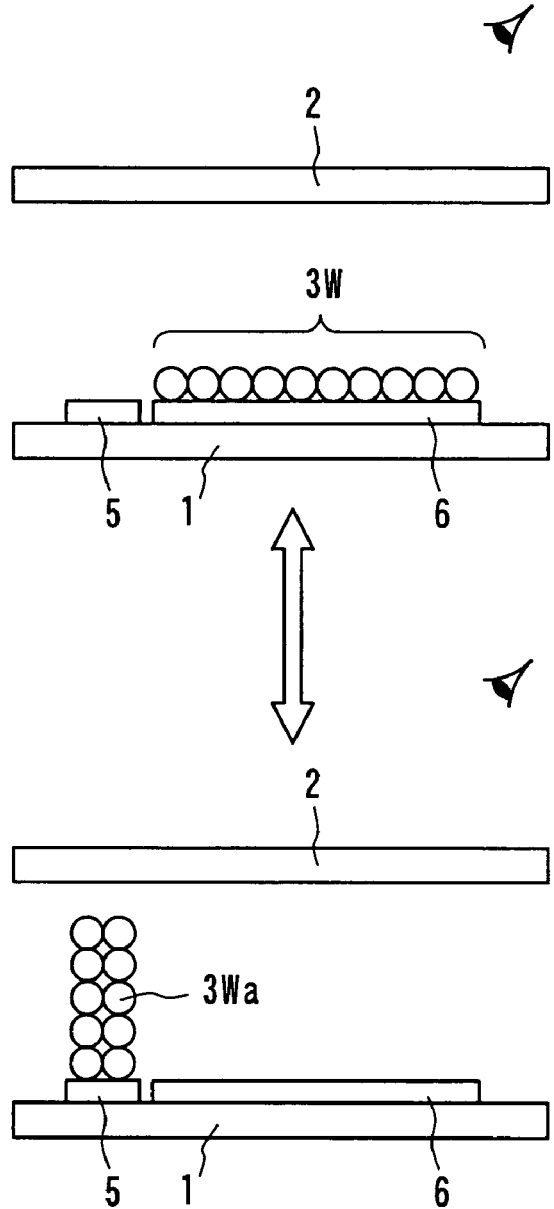
FIGS. 3a and 3b are schematic views respectively depicting still another embodiment of the information display panel according to the invention.
Figure 3:
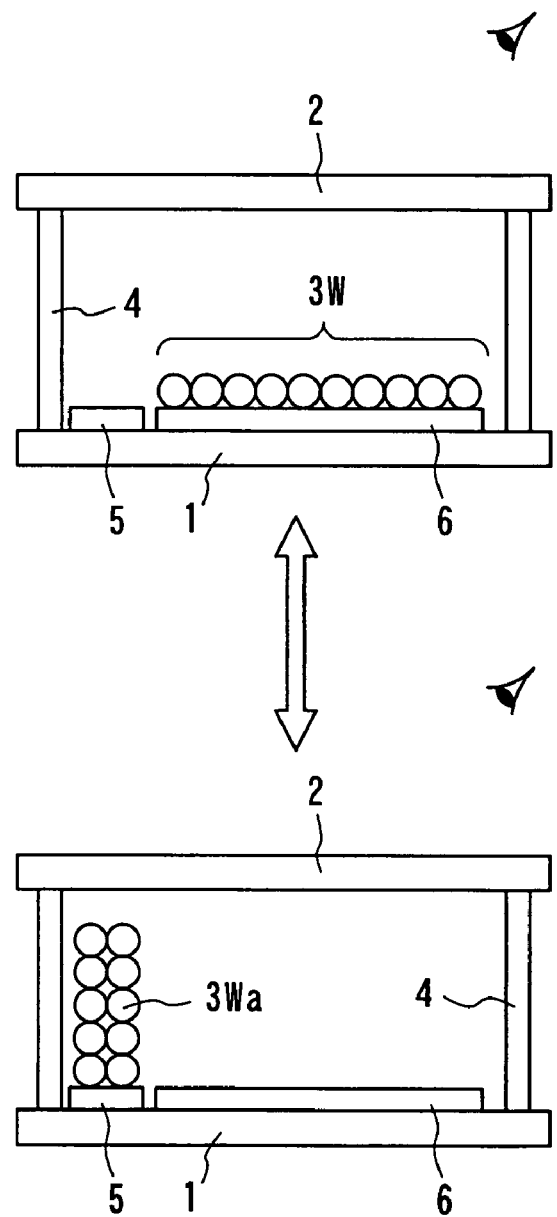

Hereinafter, best mode for carrying out the invention will be explained with reference to the drawings.

At first, a basic construction of an information display panel according to the present invention will be explained. In the information display panel used in the present invention, an electrostatic field is applied to display media sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

Examples of the information display panel that is a object of the invention will be explained with reference to FIGS. 1a and 1b-FIGS. 3a and 3b.

In the examples shown in FIGS. 1a and 1b, at least two or more groups of display media 3 having different optical reflectance and different charge characteristics and consisting of at least one or more groups of particles (here, white color display media 3W made of the particles for white color display media 3Wa and black color display media 3B made of the particles for black color display media 3Ba are shown) are moved in a perpendicular direction with respect to substrates 1 and 2, in accordance with an electric field applied outside of the substrates 1 and 2, so as to display a black color by viewing the black color display media 3B to an observer or so as to display a white color by viewing the white color display media 3W to the observer. In the example shown in FIG. 1b, a cell is formed by arranging for example grid-like partition walls 4 between the substrates 1 and 2, in addition to the example shown in FIG. 1a. Moreover, in FIG. 1b, the partition walls arranged at the near side are omitted.

In the examples shown in FIGS. 2a and 2b, at least two or more groups of display media 3 having different optical reflectance and different charge characteristics and consisting of at least one or more groups of particles (here, white color display media 3W made of the particles for white color display media 3Wa and black color display media 3B made of the particles for black color display media 3Ba are shown) are moved in a perpendicular direction with respect to substrates 1 and 2, in accordance with an electric field generated by applying a voltage between an electrode 5 arranged to the substrate 1 and an electrode 6 arranged to the substrate 2, so as to display a black color by viewing the black color display media 3B to an observer or so as to display a white color by viewing the white color display media 3W to the observer. In the example shown in FIG. 2b, a cell is formed by arranging for example grid-like partition walls 4 between the substrates 1 and 2, in addition to the example shown in FIG. 2a. Moreover, in FIG. 2b, the partition walls arranged at the near side are omitted.

In the examples shown in FIGS. 3a and 3b, at least one group of display media 3 having optical reflectance and charge characteristic and consisting of at least one or more groups of particles (here, white color display media 3W made of the particles for white color display media) are moved in a parallel direction with respect to substrates 1 and 2, in accordance with an electric field generated by applying a voltage between the electrode 5 arranged to the substrate 1 and the electrode 6 arranged to the substrate 1, so as to display a white color by viewing the white color display media 3W to an observer or so as to display a color of the electrode 6 or the substrate 1 by viewing a color of the electrode 6 or the substrate 1 to the observer. In the example shown in FIG. 3b, a cell is formed by arranging for example grid-like partition walls 4 between the substrates 1 and 2, in addition to the example shown in FIG. 3a. Moreover, in FIG. 3b, the partition walls arranged at the near side are omitted.

Hereinafter, the particles for display media, which are the feature of the invention, will be explained in detail. The particles for display media according to the invention can be applied to the information display panel having the constructions shown in FIGS. 1a, 1b-FIGS. 3a, 3b, and they are sealed between two substrates, at least one substrate being transparent, as the display media in the information display panel mentioned above. As the particles for display media, use is made of the particles for display media, which are produced by crushing resin blocks and classifying them, wherein Izot impact strength of the resin constituting the particles for display media (based on ASTM D256) is less than 4 kgf·cm/cm and a deflection temperature under load of the resin constituting the particles for display media (base on ASTM D648) exceeds 100° C. As the resin constituting the particles for display media mentioned above, it is preferred that use is made of cycloolefin resin that is a thermal plastic resin satisfying two conditions mentioned above.

In addition, the following cases are preferred: such that an average particle diameter is 0.1-50 μm; such that a charge amount of the particles for display media measured by a blow-off method utilizing carriers is 10-100 μC/g in an absolute value; and such that the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge.

In the particles for display media according to the invention, since the particles for display media used for the information display panel having the constructions shown in FIGS. 1a, 1b-FIGS. 3a, 3b are produced by crushing resin blocks and classifying them, wherein Izot impact strength of the resin constituting the particles for display media (based on ASTM D256) is less than 4 kgf·cm/cm and a deflection temperature under load of the resin constituting the particles for display media (base on ASTM D648) exceeds 100° C., the particles for display media uses the resin having a high heat resistance that is easily crushable, and thus the particles for display media have a high heat resistance and maintain an amount of the pigment as demonstrated by the following examples. Moreover, the information display panel shown in FIGS. 1a, 1b-FIGS. 3a, 3b utilizing the particles for display media mentioned above achieves an excellent endurance and an excellent display quality.

Hereinafter, respective members constituting the information display panel according to the invention will be explained.

As the substrate, at least one of the substrates is the transparent substrate through which a color of the display media can be observed from outside of the panel, and it is preferred to use a material having a high transmission factor of visible light and an excellent heat resistance. The other substrate may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback as a thin-type information display panel.

As a material of the electrode arranged to the substrate according to need, use is made of metals such as aluminum, silver, nickel, copper, gold, or, conductive metal oxides such as indium tin oxide (ITO), indium oxide, conductive tin oxide, antimony tin oxide (ATO), conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, or, a method in which conductive materials and solvents are mixed with synthetic resin binder and the mixture is sprayed to perform pattering. A transparency is necessary for the electrode arranged to the substrate at an observation side (display surface side), but it is not necessary for the electrode arranged to the substrate at a rear side. In both cases, the materials mentioned above, which are transparent and have a pattern formation capability, can be suitably used. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode arranged to the rear substrate are the same as those of the electrode arranged to the substrate at the display side, but transparency is not necessary. In this case, the applied outer voltage may be superimposed with a direct current or an alternate current.

As the partition wall arranged to the substrate according to need, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-100 μm more preferably 10-50 μm.

Moreover, as a method of forming the partition wall, use may be made of a double rib method wherein ribs are formed on the opposed substrates 1 and 2 respectively and they are connected with each other and a single rib method wherein a rib is formed on one of the opposed substrates only. The present invention may be preferably applied to both methods mentioned above.

Figure 4:
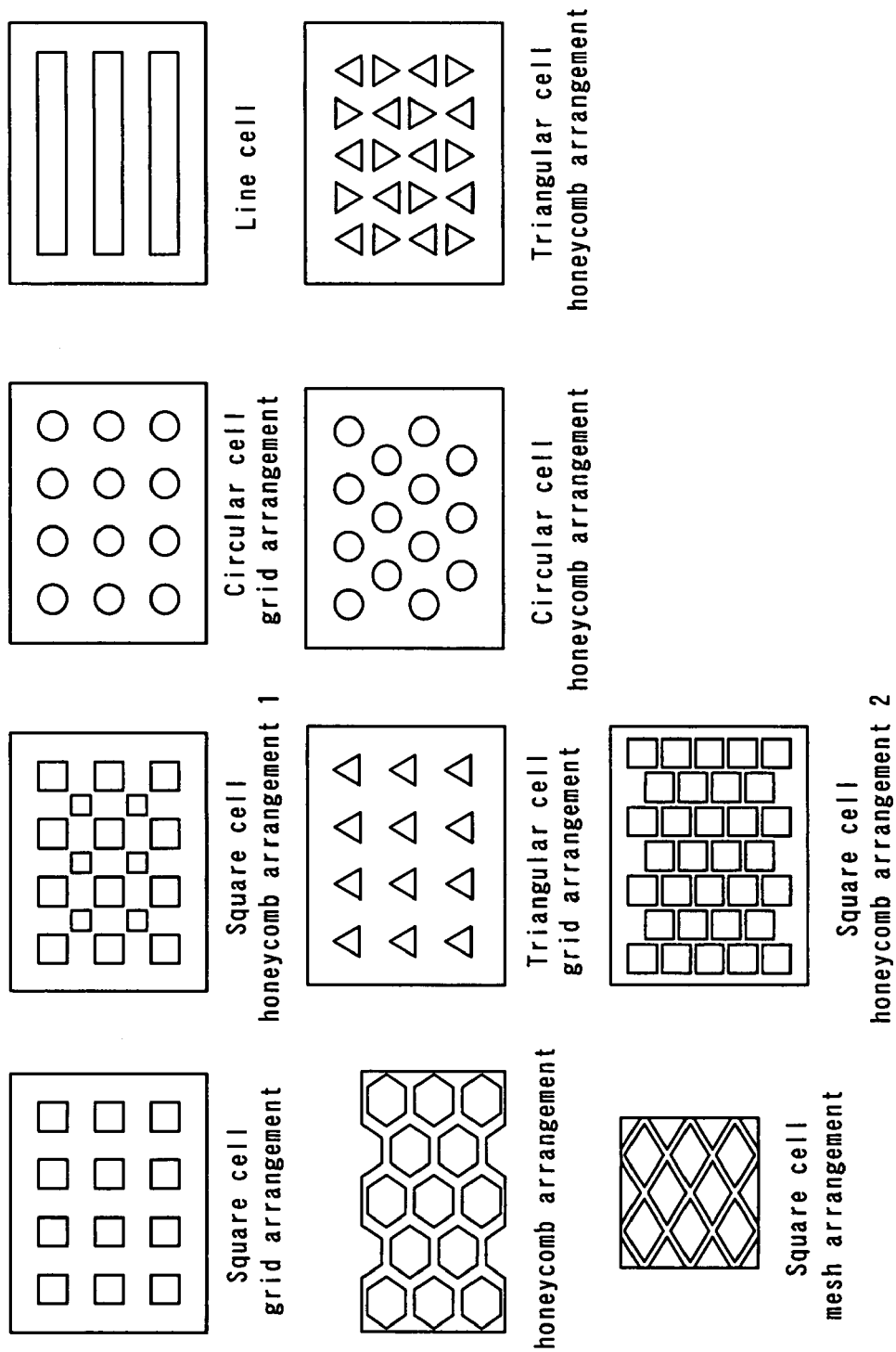
FIG. 4 is a schematic view showing one embodiment of a shape of the partition walls in the information display panel according to the invention.

The cell formed by the partition walls each made of rib has a square shape, a triangular shape, a line shape, a circular shape and a hexagon shape, and has an arrangement such as a grid, a honeycomb and a mesh, as shown in FIG. 4 viewed from a plane surface of the substrate. It is preferred that the portion corresponding to a cross section of the partition wall observed from the display side (an area of the frame portion of the cell) should be made as small as possible. In this case, a clearness of the image display can be improved.

The formation method of the partition wall is not particularly restricted, however, a die transfer method, a screen-printing method, a sandblast method, a photolithography method and an additive method may be preferably used. Among them, it is preferred to use a photolithography method using a resist film or a die transfer method.

Although the method for charging the particles negatively or positively is not particularly limited, a corona discharge method, an electrode injection-charge method, a friction charge method and so on are employable. It is preferred that the particle measured by a blow-off method by using carriers has a charge amount of 10-100 μC/g in absolute value. When the absolute value of the charge amount of the particles is smaller than this range, the response speed in response to a deviation of the electrostatic field becomes slower and the memory characteristics become lower. When the absolute value of the charge amount of the particles is larger than this range, an imaging force to the substrate and electrode becomes too stronger. Therefore, the following ability at the inversion of its electric field becomes poor, but the memory characteristic is favorable.

In the invention, a charge amount measuring method is as follows.

<Blow-Off Measuring Theory and Method>

In the blow-off method, a mixture of the particles and the carriers are placed into a cylindrical container with nets at both ends, and high-pressure gas is blown from the one end to separate the powders and the carriers, and then only the powders are blown off from the mesh of the net. In this occasion, charge amount of reverse blown polarity remains on the carriers with the same charge amount of the powders carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

As a blow-off powder charge amount measuring instrument, TB-200 produced by Toshiba Chemical Co., Ltd. was used. In this invention, ferrite carriers are used for the charge amount measurement of the particles to be measured. However, when two groups of display media consisting of the display media constituted by positively chargeable particles and the display media constituted by negatively chargeable particles are mixed to be used in the information display panel, the same kind of carriers are used for measuring a charge amount of the particles for display media constituting respective display media. Specifically, use is made of DFC100 LINKL (ferrite including Mn—Mg) produced by DOWA IRON POWDER CO,. LTD. as the carriers, and a charge amount of the particles (μC/g) is measured.

Because it is necessary for the particles to hold the charged electric charge, insulating particles with the volume specific resistance of $1 \times 10^{10} \Omega \cdot cm$ or greater are preferable, and in particular, insulating particles with the volume specific resistance of $1 \times 10^{12} \Omega \cdot cm$ or greater are more preferable. Further, the particles with slow charge attenuation property evaluated by the measuring method below are more preferable.

That is, the particles to be measured are arranged to a surface of a measurement jig having a roll shape, and the voltage of 8 kV is applied to a Corona generator disposed with a distance of 1 mm to the thus arranged particle surface so as to generate Corona discharge, which charges the particle surface. Then, the change of the surface potential is measured to determine the suitability. In this occasion, it is preferable to select the material whose maximum surface potential will be 300 V or greater more preferably 400 V or greater after 0.3 seconds as the material for composing the particles.

Figure 5:
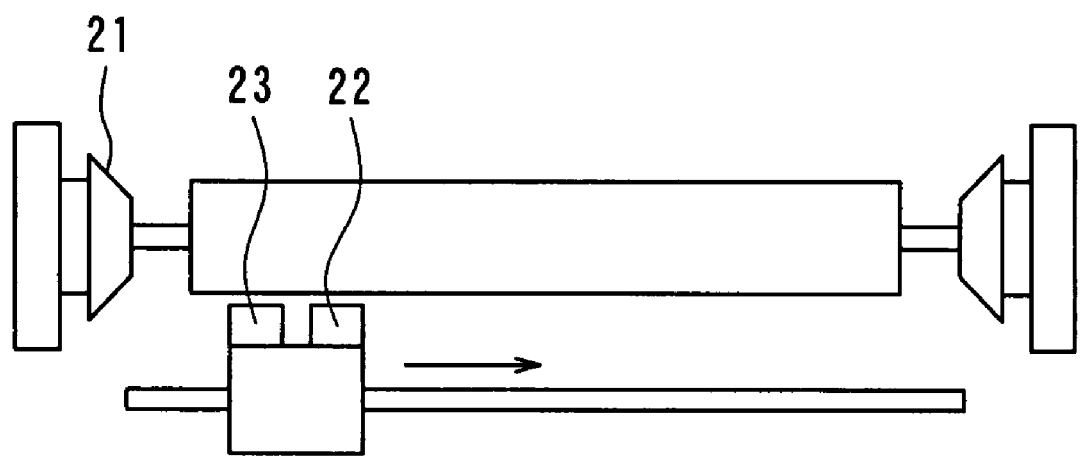
FIG. 5 is a schematic view illustrating a surface potential measuring method of the particles for display media used for the information display panel according to the invention.

Additionally, the foregoing surface potential is measured by means of an instrument (CRT2000 produced by QEA Inc.) as shown in FIG. 5. In this instrument both end portions of a roll shaft being held with chuck 21, compact scorotron discharger 22 and surface potential meter 23 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5% RH.

Then, the particles for display media (hereinafter, sometimes called as particles) constituting the display media used in the information display panel according to the invention will be explained. The particles for display media are used as the display media as they are, or, used as the display media after they are mixed with another particles.

The particle may be composed of resins as a main ingredient, and can include according to need charge control agents, coloring agent, inorganic additives and so on as is the same as the known one. Hereinafter, typical examples of resin, charge control agent, coloring agent, additive and so on will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent.

Moreover, as the particle diameter of the particles for display media (sometimes called as particles), it is preferred to set an average particle diameter d(0.5) to 0.1-50 μm and to use even particles. If the average particle diameter d(0.5) exceeds this range, the image clearness sometimes deteriorated, and, if the particle diameter is smaller than this range, an agglutination force between the particles becomes too large and the movement of the particles is prevented.

Further, it is preferred that particle diameter distribution Span of the particles for display media, which is defined by the following formula, is less 5 preferably less than 3:

$$Span=(d(0.9)-d(0.1))/d(0.5)$$

(here, d(0.5) means a value of the particle diameter expressed by μm wherein an amount of the particles having the particle diameter larger than or smaller than this value is 50%, d(0.1) means a value of the particle diameter expressed by μm wherein an amount of the particles having the particle diameter smaller than this value is 10%, and d(0.9) means a value of the particle diameter expressed by μm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of d(0.5) of the particles having smallest diameter with respect to d(0.5) of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Further, in the dry-type information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH.

The above gap means a gas portion surrounding the display media obtained by substituting the electrodes 5, 6 (in the case of arranging electrode inside of substrate), an occupied portion of the display media 3, an occupied portion of the partition walls 4 and a seal portion of the device from the space between the substrate 1 and the substrate 2 for example in FIGS. 1a and 1b-FIGS. 3a and 3b.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10-500 μm, preferably 10-200 μm.

Moreover, it is preferred to control a volume occupied rate of the display media in a space between the opposed substrates to 5-70%, more preferably 5-60%. If the volume occupied rate of the display media exceeds 70%, the display media become difficult to move, and if it is less than 5%, a sufficient contrast cannot be obtained and a clear image display is not performed.

EXAMPLES

Hereinafter, the present invention will be explained further specifically with reference to the examples according to the invention and the comparative examples, but the present invention is not limited to the following examples. In the information display panel according to the examples and the comparative examples, the particles produced according to the method mentioned below were sealed in a space between the substrates together with a dry air having a humidity of not more than 50% RH, and the estimation was performed according to the standard mentioned above.

Example 1

As for the particles for black color display media, the following particles were prepared. 3 parts by weight of nigrosine compound (Bontron N07: product of Orient Chemical Industries, Ltd.) as a positive charge control agent, and, 5 parts by weight of carbon black (SPECIAL BLACK 5: product of Degussa) as black pigment were dispersed by a sand mill in 60 parts by weight of methyl methacrylate (KANTO CHEMICAL's reagent) and 40 parts by weight (about 25 mol %) of ethylene glycol di-methacrylate (Wako Pure Chemical's reagent) as multifunctional monomer having a plurality of polymerization reaction groups in one molecule; 5 parts by weight of (acrylic or methacrylic) resin— (acrylic or methacrylic having hydro carbon or fluorohydrocarbon at side-chain) resin block copolymer (MODIPER F600: product of NOF CORPORATION, carbon fluoride component $C_8F_{17}$) was dissolved therein; and then 2 parts by weight of lauryl peroxide (PEROYL L: product of NOF CORPORATION) was further dissolved therein so as to obtain a liquid. The thus obtained liquid was suspended and polymerized in a purified water in which 0.5% of polyoxyethylene ether sodium sulfate (LATEMURU E-118B: product of KAO CORPORATION) as a surface active agent was added, and then the thus polymerized liquid was subjected to a filtering and drying process. Then, the particles having an average particle diameter of 9.3 μm were obtained by classifying the dried member by means of classifier (MDS-2: NIPPON PNEUMATIC MFG. CO., LTD.). 2 weight % of silica fine particles (H3050: product of Clarient Japan K.K.) was added to the thus obtained particles and the mixture was agitated by Henschel mixer (KM5C: product of MITSUI MINING CO., LTD.) to obtain particles for black color display media B1. Properties of the particles for black color display media B1 are shown in Table 1.

The particles for black color display media are not limited to the above example since the present invention is characterized by particles for white color display media as explained below, and thus various particles for black color display media other than the above example can be used.

As for the particles for white color display media, the following particles were prepared. 100 parts by weight of cycloolefin resin (ZEONEX 330R: product of ZEON CORPORATION), 100 parts by weight of titanium oxide (TIPAQUE CR-90, product of ISHIHARA SANGYO KAISHA, LTD.), and 3 parts by weight of salicylic acid metal complex (Bontron E88: product of Orient Chemical Industries, Ltd.) as a negative charge control agent were agitated and mixed by Henschel mixer (KM5C: product of MITSUI MINING CO., LTD.). Then, the mixture was kneaded by twin screw extruder (KZW15-45MG: product of TECNOVEL CORPORATION), crushed and classified by classifier (MDS-2: NIPPON PNEUMATIC MFG. CO., LTD.) to obtain particles having an average particle diameter of 9.0 μm. 2 weight % of silica fine particles (H3004: product of Clarient Japan K.K.) was added to the thus obtained particles and the mixture was agitated by Henschel mixer (KM5C: product of MITSUI MINING CO., LTD.) to obtain particles for white color display media W1. Properties of the resin itself and the particles for white color display media W1 are shown in Table 1.

Example 2

Particles for white color display media W2 were produced in the same manner as that of the particles for white color display media W1 in the Example 1 except that 50 parts by weight of cycloolefin resin (ZEONEX 330R: product of ZEON CORPORATION) and 50 parts by weight of cycloolefin resin (ZEONOR 1410R: product of ZEON CORPORATION) were mixed when producing the particles of white color display media. Properties of the resin itself and the particles for white color display media W2 are shown in Table 1.

Example 3

Particles for white color display media W3 were produced in the same manner as that of the particles for white color display media W1 in the Example 1 except that cycloolefin resin (ZEONEX 480R: product of ZEON CORPORATION) was used instead of cycloolefin resin (ZEONEX 330R: product of ZEON CORPORATION) in the Example 1. Properties of the resin itself and the particles for white color display media W3 are shown in Table 1.

Example 4

Particles for white color display media W4 were produced in the same manner as that of the particles for white color display media W1 in the Example 1 except that cycloolefin resin (APEL APL6013T: product of Mitsui Chemical, Inc.) was used instead of cycloolefin resin (ZEONEX 330R: product of ZEON CORPORATION) in the Example 1. Properties of the resin itself and the particles for white color display media W4 are shown in Table 1.

Comparative Example 1

Particles for white color display media W5 were produced in the same manner as that of the particles for white color display media W1 in the Example 1 except that cycloolefin resin (ZEONOR 1410R: product of ZEON CORPORATION) was used instead of cycloolefin resin (ZEONEX 330R: product of ZEON CORPORATION) in the Example 1. Properties of the resin itself and the particles for white color display media W5 are shown in Table 1.

Comparative Example 2

Particles for white color display media W6 were produced in the same manner as that of the particles for white color display media W1 in the Example 1 except that polycarbonate resin (Panlite K-1300Y: product of TEIJIN CHEMICALS LTD.) was used instead of cycloolefin resin (ZEONEX 330R: product of ZEON CORPORATION) in the Example 1. Properties of the resin itself and the particles for white color display media W6 are shown in Table 1.

Comparative Example 3

Particles for white color display media W7 were produced in the same manner as that of the particles for white color display media W1 in the Example 1 except that methacrylic resin (Delpet 60N: product of Asahi Kasei Chemicals Corporation) was used instead of cycloolefin resin (ZEONEX 330R: product of ZEON CORPORATION) in the Example 1. Properties of the resin itself and the particles for white color display media W7 are shown in Table 1.

Comparative Example 4

Particles for white color display media W8 were produced in the same manner as that of the particles for white color display media W1 in the Example 1 except that styrene resin (TOYO STYROL E640N: TOYO-STYRENE CO,. LTD.) was used instead of cycloolefin resin (ZEONEX 330R: product of ZEON CORPORATION) in the Example 1. Properties of the resin itself and the particles for white color display media W8 are shown in Table 1.

Comparative Example 5

Particles for white color display media W9 were produced in the same manner as that of the particles for white color display media W1 in the Example 1 except that cycloolefin resin (ZEONOR 1060R: product of ZEON F CORPORATION) was used instead of cycloolefin resin (ZEONEX 330R: product of ZEON CORPORATION) in the Example 1. Properties of the resin itself and the particles for white color display media W9 are shown in Table 1.

<Property Evaluation Method>

[Charge Amount]
The charge amount was measured according to "blow-off method" mentioned above.

[Deflection Temperature Under Load]
The deflection temperature under load was measured on the basis of ASTM D648 under load of 1.8 MPa.

[Izot Impact Strength]
The Izot impact strength was measured on the basis of ASTM D256 by using a specimen having a notch.

[Amount of Titanium Oxide]
The particles for white color display media were heated to 600° C. by an electric furnace, and an amount of titanium oxide in the particles for white display media was measured from remaining amount thereof after heating.

[Properties of Information Display Panel]
The properties of the information display panels produced respectively by using the particles for black color display media B1 and the particles for white color display media W1-W9 are shown in Table 1. Contrast was measured in such a manner that black color density ODb in the case of black color displaying and black color density ODw in the case of white color displaying when applying ±100 V thereto were measured by using a reflection image densitometer (RD-19I: product of GretagMacbeth AG) and a contrast was defined as follows:

$$\text{contrast} = 10^{(ODb-ODw)}.$$

Moreover, the contrast after heating the information display panel to 100° C. was compared.

TABLE 1

| | | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|
| | Positively charged black color particles | | | | | | B1 | | | |
| Properties | Average particle diameter (μm) | | | | | | 9.3 | | | |
| | Average charge amount (μC/g) | | | | | | 20.8 | | | |
| | Negatively charged white color particles | W1 | W2 | W3 | W4 | W5 | W6 | W7 | W8 | W9 |
| Properties of resin | Deflection temperature under load (° C.) | 103 | 123 | 123 | 115 | 136 | 132 | 89 | 74 | 99 |
| | Izot impact strength (kgf · cm/cm) | 1.3 | 3.8 | 2.4 | 2.5 | 4.5 | 10.0 | 1.6 | 5.4 | 1.8 |
| | Pressure under crushing (MPa) | 0.3 | 0.5 | 0.4 | 0.4 | 0.7 | 0.8 | 0.35 | 0.6 | 0.37 |
| Properties | Amount of titanium oxide (parts by weight) | 94 | 75 | 86 | 83 | 54 | 42 | 80 | 70 | 91 |
| | Average particle diameter (μm) | 9.0 | 9.6 | 9.2 | 9.3 | 9.8 | 10.8 | 9.2 | 9.3 | 9.1 |
| | Average charge amount (μC/g) | −19.4 | −16.1 | −20.5 | −18.8 | −9.8 | −8.6 | −10.7 | −22.3 | −17.7 |
| Display performance | Initial contrast ratio | 6.4 | 6.0 | 6.3 | 6.2 | 4.3 | 3.9 | 6.2 | 6.0 | 6.4 |
| | Contrast ratio after 100° C. heating | 6.4 | 6.0 | 6.3 | 6.2 | 4.3 | 3.9 | Not moved | Not moved | Not moved partly |

The information display panel, in which the display media formed by the particles for display media according to the invention are used, is preferably applicable to the display unit for mobile equipment such as notebook personal computers, PDAs, cellular phones, handy terminals and so on; to the electric paper such as electric books, electric newspapers, electric manual (instruction) and so on; to the bulletin boards such as signboards, posters, blackboards and so on; to the image display unit for electric calculator, home electric appliication products, auto supplies and so on; to the card display unit such as point cards, IC cards and so on; and to the display unit for electric advertisements, electric POPs (Point of Presence, Point of Purchase advertising), electric price tags, electric shelf tags, electric musical score, RF-ID device and so on.

The invention claimed is:

1. Particles for display media constituting the display media used for an information display panel, in which the display media are sealed between two substrates, at least one substrate being transparent, and, in which the display media, to which an electrostatic field is applied, are made to move so as to display information such as an image, comprising the particles for display media, which are produced by crushing resin blocks and classifying them, wherein Izot impact strength of the resin constituting the particles for display media based on ASTM D256 is less than 4 kgf·cm/cm and a deflection temperature under load of the resin constituting the particles for display media based on ASTM D648 exceeds 100° C.

2. The particles for display media according to claim 1, wherein a material of the resin is cycloolefin resin.

3. The particles for display media according to claim 1, wherein an average particle diameter is 0.1-50 μm.

4. The particles for display media according to claim 1, wherein a charge amount of the particles for display media measured by a blow-off method utilizing carriers is 10-100 μC/g in an absolute value.

5. The particles for display media according to claim 1, wherein the particles in which the maximum surface potential, in the case that the surface of the particles is charged by a generation of Corona discharge caused by applying a voltage of 8 KV to a Corona discharge device deployed at a distance of 1 mm from the surface, is 300 V or greater at 0.3 second after the discharge.

6. An information display panel comprising a construction: such that at least one or more groups of display media including the particles for display media set forth in claim 1 are sealed between two opposed substrates, at least one substrate being transparent; and such that the display media, to which an electrostatic field generated between the substrates is applied, are made to move so as to display information such as an image.

* * * * *